US006534974B1

(12) United States Patent
Bowen et al.

(10) Patent No.: US 6,534,974 B1
(45) Date of Patent: Mar. 18, 2003

(54) MAGNETIC HEAD TESTER WITH WRITE COIL AND READ COIL

(75) Inventors: Arlen John Bowen, Rochester, MN (US); Nathaniel Carl Anderson, Pine Island, MN (US); Robert Duane Ahmann, Rochester, MN (US)

(73) Assignee: Pemstar, Inc,, Rochester, MN (US)

( * ) Notice: Subject to any disclaimer, the term of this patent is extended or adjusted under 35 U.S.C. 154(b) by 0 days.

(21) Appl. No.: 09/646,443

(22) PCT Filed: Feb. 21, 1997

(86) PCT No.: PCT/US97/02666

§ 371 (c)(1),
(2), (4) Date: Jan. 8, 2001

(87) PCT Pub. No.: WO98/37429

PCT Pub. Date: Aug. 27, 1998

(51) Int. Cl.[7] .......................... G01R 33/12; G01R 31/02; G11B 5/455; H01F 5/00
(52) U.S. Cl. ...................... 324/210; 324/228; 324/239; 324/207.17; 324/750; 29/603.09; 336/200
(58) Field of Search ........................ 324/207.16–207.19, 324/210, 212, 226–228, 239–243, 262, 537, 750; 29/593, 603.09; 360/6, 31; 336/200

(56) References Cited

U.S. PATENT DOCUMENTS

| | | | | |
|---|---|---|---|---|
| 3,504,276 A | * | 3/1970 | Proctor et al. | |
| 3,710,235 A | * | 1/1973 | Barrager et al. | 324/210 |
| 3,820,110 A | * | 6/1974 | Henrich et al. | 324/207.16 X |
| 4,121,156 A | * | 10/1978 | Olson | 324/210 |
| 4,313,151 A | * | 1/1982 | Vranken | 336/200 X |
| 4,425,511 A | | 1/1984 | Brosh | 324/207.17 X |
| 4,494,100 A | | 1/1985 | Stengel et al. | 336/200 |
| 4,703,382 A | * | 10/1987 | Schewe et al. | 360/125 |
| 4,853,633 A | | 8/1989 | Matsumoto | 324/210 |
| 4,873,757 A | * | 10/1989 | Williams | |
| 5,086,274 A | | 2/1992 | Gobin et al. | 324/239 |
| 5,389,876 A | | 2/1995 | Hedengren et al. | 324/242 |
| 5,479,098 A | * | 12/1995 | Yokoyama et al. | 324/212 |
| 5,926,019 A | * | 7/1999 | Okumura | 324/537 X |

FOREIGN PATENT DOCUMENTS

JP     6173221     4/1986

OTHER PUBLICATIONS

IBM Technical Disclosure Bulletin, vol. 17, No. 1, Jun. 1974. W.H. Buckthal, "Read/Write Test Head", p. 39.

* cited by examiner

Primary Examiner—Gerard R. Strecker
(74) Attorney, Agent, or Firm—Dorsey & Whitney LLP (57) ABSTRACT

The present invention relates to a head tester for testing heads having a read element and a write element. The tester comprises a substrate on which a read coil is positioned to be sensitive to the write element of the head. A write coil is also formed on the substrate and this coil is positioned such that the read element of the head to be tested is sensitive to the write coil.

47 Claims, 8 Drawing Sheets

MAGNETIC HEAD TESTER WITH WRITE COIL AND READ COIL

RELATED APPLICATIONS

This application claims the priority of international application number PCT/US97/02666, filed Feb. 21, 1997.

TECHNICAL FIELD

The present invention relates to an apparatus for testing heads on a Head Stack Assembly ("HSA") or single head suspension. More particularly, the present invention relates to a multi-coil assembly for testing heads.

BACKGROUND OF THE INVENTION

Each hard disk or hard file contains a magnetic recording head for reading from and writing to the hard disk. The head is a part of a head stack assembly ("HSA") that contains the air bearing surface that allows the head to fly close to the hard disk. The head also contains the elements needed to write magnetic transitions on a hard disk and the elements needed to read magnetic transitions previously written by a head. A typical write element contains thin film conductors looped inside soft magnetic pole pieces. A typical read element is a magneto-resistive (MR) strip that changes resistivity as a magnetic field is applied.

During the manufacturing of magnetic disk drives or hard files, the heads must be tested to determine whether the heads are functioning properly. A properly functioning magnetic recording head must be able to read from a hard disk and write to a hard disk. For many years, external magnetic coils have been used to test the read elements of a head. These coils apply a magnetic field to the read element, thereby attempting to energize the read elements, which provides an indication of functionality. The early external magnetic coils were very large and one pair of coils would excite an entire stack of heads. These large coils could excite the head read elements, but they could not read the small magnetic field from one head when the head was writing. The large coils were further limited in capability by the low frequency response inherent in a large structure.

Figure 1:
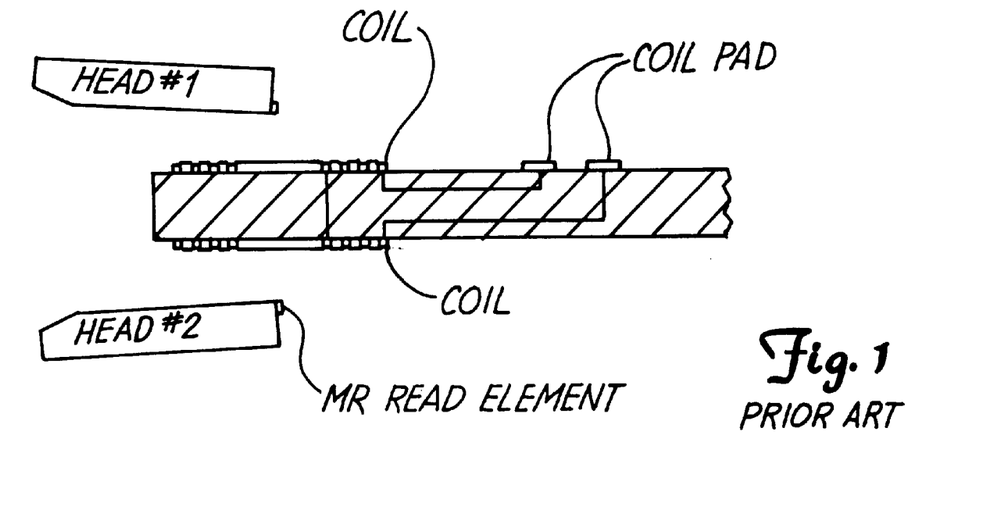
FIG. 1 shows a cross-sectional view of prior art coil technology for testing the head's ability to read.

The next generation of head testers were smaller and could fit between head pairs in a stack of heads. Early versions of these head testers could only excite the head's read element, later versions could also read as the head would write. FIG. 1 illustrates this next generation head tester. As shown in FIG. 1, a printed circuit board with a coil wrap having a plurality of turns is attached to the printed circuit board. There are two coil pads to facilitate connection to a testing device.

A number of limitations were uncovered with this type of head tester and similar head testers in the industry: (1) the head testers were inconvenient to use to test both the read and write elements of a head; (2) the head testers did not enable a testing device to accurately determine the sensitivity of the read/write elements of a head; (3) the head tester could not be used to enable a testing device to determine whether a head was incorrectly wired; (4) the head tester could not be used to enable a testing device to determine whether the spacing between the head and the coil on the head tester was within an acceptable range of distances; and (5) the head tester could not be used to determine whether the heads in a head stack assembly were properly aligned.

Figure 2:
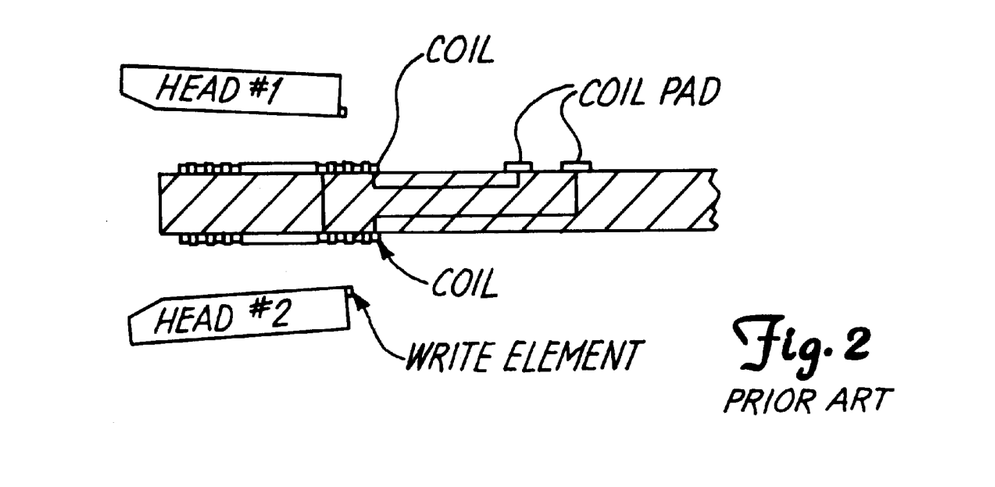
FIG. 2 shows a cross-sectional view of prior art coil technology for testing the head's ability to write.

First, the head testers shown in FIGS. 1 and 2 are inconvenient to use to test both the read and write elements of a head. An important aspect to note in FIG. 1 is the horizontal location of the MR read elements with respect to the central axis of the coil. The MR elements are located on the axis and in this position the MR read elements are most responsive to the applied magnetic field. However, the location of the coil axis and the head, shown in FIG. 1, needs to be changed when the head is writing. If the coil in FIG. 1 is used to read the magnetic field from the head's thin film write ("TFW") elements, the magnitude of the magnetic field is symmetrical about the axis of the coil. This field produces electric potentials in the windings of the coil that cancel each other. This cancellation results is no voltage being present at the coil pads when the head writes while the head tester is positioned as shown in FIG. 1. FIG. 2 shows the horizontal location of the head's TFW element (i.e., the write element) where the voltage read at the coil pads is optimum. In FIG. 2, the TFW element is located over (or under) one side of the coil to allow the electric potentials in the windings not to cancel each other. The distance between the TFW element (i.e., the write element) and the MR element (i.e., the read element) of one head is very small and for this discussion they are assumed to be at the same location on the head. The result is that if both reading by the head and reading by the coil are to be performed, either the heads or the coils must be relocated horizontally between the two modes of reading. Thus, either the heads or the coil needs to be horizontally relocated when they are being used in a test application that requires both read modes. The time needed to move the heads (or the head tester) between the two read modes increases the overall test time and negatively effects the positional accuracy, thereby inconveniencing the user.

Second, the head testers shown in FIGS. 1 and 2 can only make approximate measurements of the read and write elements sensitivity due to the uncertainty of the vertical spacing between the coil and the head's read or write element. The spacing between the head and coil varies due to head tilt, separation of the head from the suspension load dimple, and dimensional tolerances between the head separator and the coil. Variations of 30 to 50% can be observed in the voltage's being read as the spacing changes over the range allowed by current HSA and coil technology. Thus, a tester that can enable a more accurate determination of the sensitivity of the read and write elements of a head is desirable.

The third problem is the use of one coil on a head tester for two heads. If the head selection circuitry is improperly assembled, the one coil can not detect the case where the two head selection lines are reversed at the same time the polarity of the head element is reversed. This type of assembly error commonly occurs during production. Thus, a tester that can enable a determination of whether the head selection circuitry is properly assembled would be desirable.

The fourth problem exists when a head is mishandled at a previous manufacturing step resulting in a spacing between the head and the coil that falls outside some acceptable range. The head tester shown in FIGS. 1 and 2 can only sense that a combination of head sensitivity and/or head spacing is causing the extra high or low signals being read. Thus, a tester that can enable a determination of whether the spacing between a coil on a head tester and a head is in an acceptable range of distances is desirable.

The fifth problem involves the precise alignment of the center of each coil in a stack of coils. The coils are to be co-axially aligned over the entire length of the stack of heads. A precise alignment of the coils in a stack of testers enables gathering positional information relating to head alignment in the HSA. Without precise alignment, the coils can not be used to determine the mechanical location of the head read/write elements in the plane of the hard disk. The head tester shown in FIGS. 1 and 2 does not provide a "designed in" method of alignment. Thus, producing a stack of head testers in which the coils are precisely aligned to enable the gathering of positional information related to head positions in the HSA is desirable.

SUMMARY OF THE DISCLOSURE

The present invention relates to a head tester for testing heads having a read element and a write element. The tester comprises a substrate on which a read coil is positioned to be sensitive to the write element of the head. A write coil is also formed on the substrate and this coil is positioned such that the read element of the head to be tested is sensitive to the write coil.

This head tester assists in the testing of head stacks (or single head suspension) assemblies. These tests performed by the tester provide an indication of the functionality of the heads.

DETAILED DESCRIPTION

Figure 3:
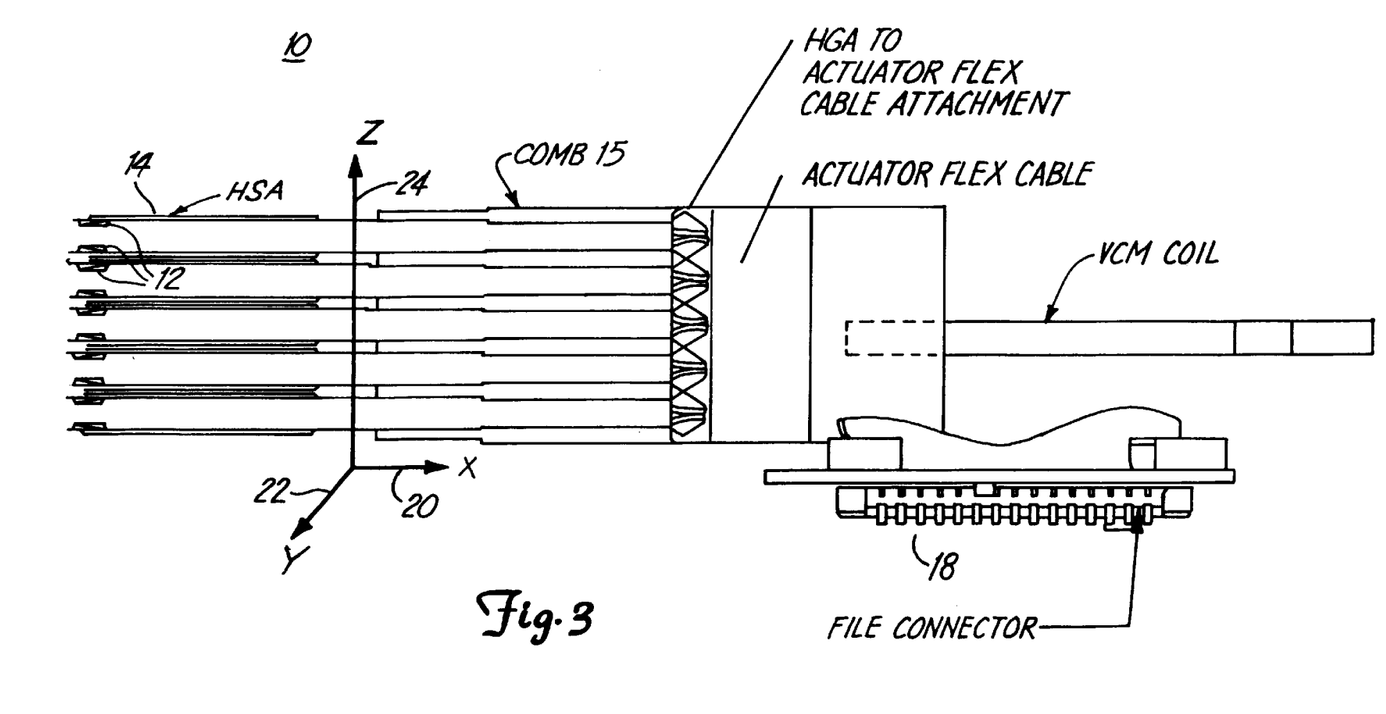
FIG. 3 shows a side view of a head stack assembly.

FIG. 3 shows a head stack assembly 10 ("HSA"). The HSA 10 generally comprises a plurality of heads 12. Each head 12 is attached to a suspension 14, which is mounted in a comb 15. Each head 12 is electrically connected to the servo voice coil motor ("VCM") coils 16 and the associated electronics 18. Generally, each head 12 is for reading from and writing to a hard disk's magnetic surface. Continuing to refer to FIG. 3, the X-axis 20 of the HSA 10 is a line that runs radial from the center of the rotational bearings to the read/write elements on the head 12. The Y-axis 22 of the HSA 10 is a line that runs tangential to the rotation of the stack should the HSA 10 be rotated. The X and the Y axis lie in the plane of the hard disk. The Z-axis 24 is normal to the plane of the disk. The Z axis ideally runs through the stack of read/write elements when the heads 12 are aligned in the X and Y direction.

The head 12 is a part of a HSA 10 that contains the air bearing surface that allows the head to fly close to the hard disk. The head 12 also contains the elements needed to write magnetic transitions on a hard disk and the elements needed to read magnetic transitions previously written by the head. A typical write element 69 (see FIG. 9) contains thin film conductors looped inside soft magnetic pole pieces. A typical read element 70 (see FIG. 8) is a magneto-resistive (MR) strip that changes resistivity as a magnetic field is applied. Although in the description a MR read/inductive write type head is described as the head type being tested by the head tester 30 of the present invention, other head types, including but not limited to, inductive read/write head type and inductive servo read/write head type may be tested with the head tester 30 of the present invention.

Figure 4:
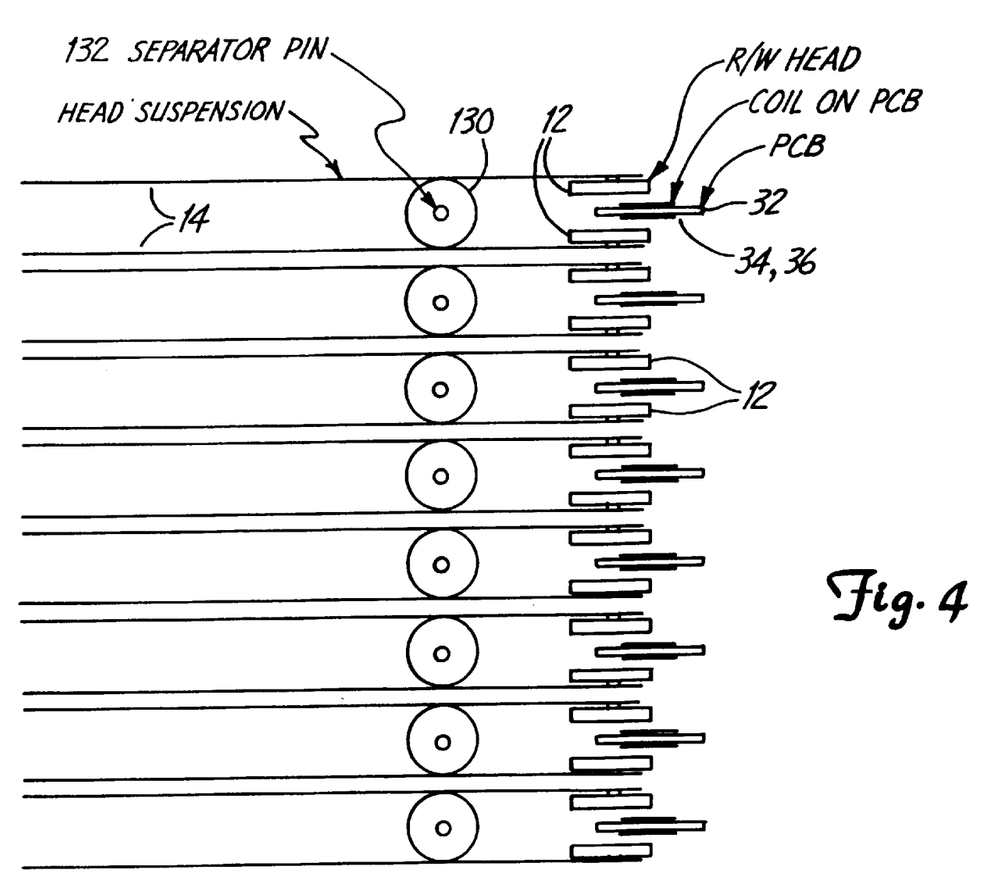
FIG. 4 shows a side view a portion of the head stack assembly with a separator located between the suspension of the head stack assembly and a stack of head testers positioned between the heads of the head stack assembly.

FIG. 4 shows a side view of a portion of the HSA 10 with a head tester 30 positioned between two heads 12 of the HSA 10. As shown in FIG. 4, a plurality of head testers 30 are used to test the plurality of heads 12 in the HSA 10.

Continuing to refer to FIG. 4, a separator 130 is placed between suspensions 14 that support heads 12 that are facing each other. A separator 130 is mechanical wedge or taper that is inserted between facing suspension arms 14 to hold the heads 12 apart. Without the separator 130 or a hard disk in place, the heads facing each other will come together due to the preload from the suspension arms 14. The separator 130 in this disclosure is used to keep the heads 12 apart and allow the insertion of a head tester 30. As shown in FIG. 4, an array of separators 130 is used to hold the entire stack of heads 12 apart while an array of head testers 30 is inserted such that one head tester 30 is inserted between two heads 12 facing each other. Testing the read and write elements 69, 70 of each head 12. After testing the read and write elements of head 12, the head testers 30 will be removed from between the heads 12. The coils 34, 36 of the head tester 30 will be removed from between the heads 12. The coils 34, 36 of the head tester 30 are mounted on a substrate 32 that is thin enough so the coils 34, 36 do not touch the heads.

Figure 5:
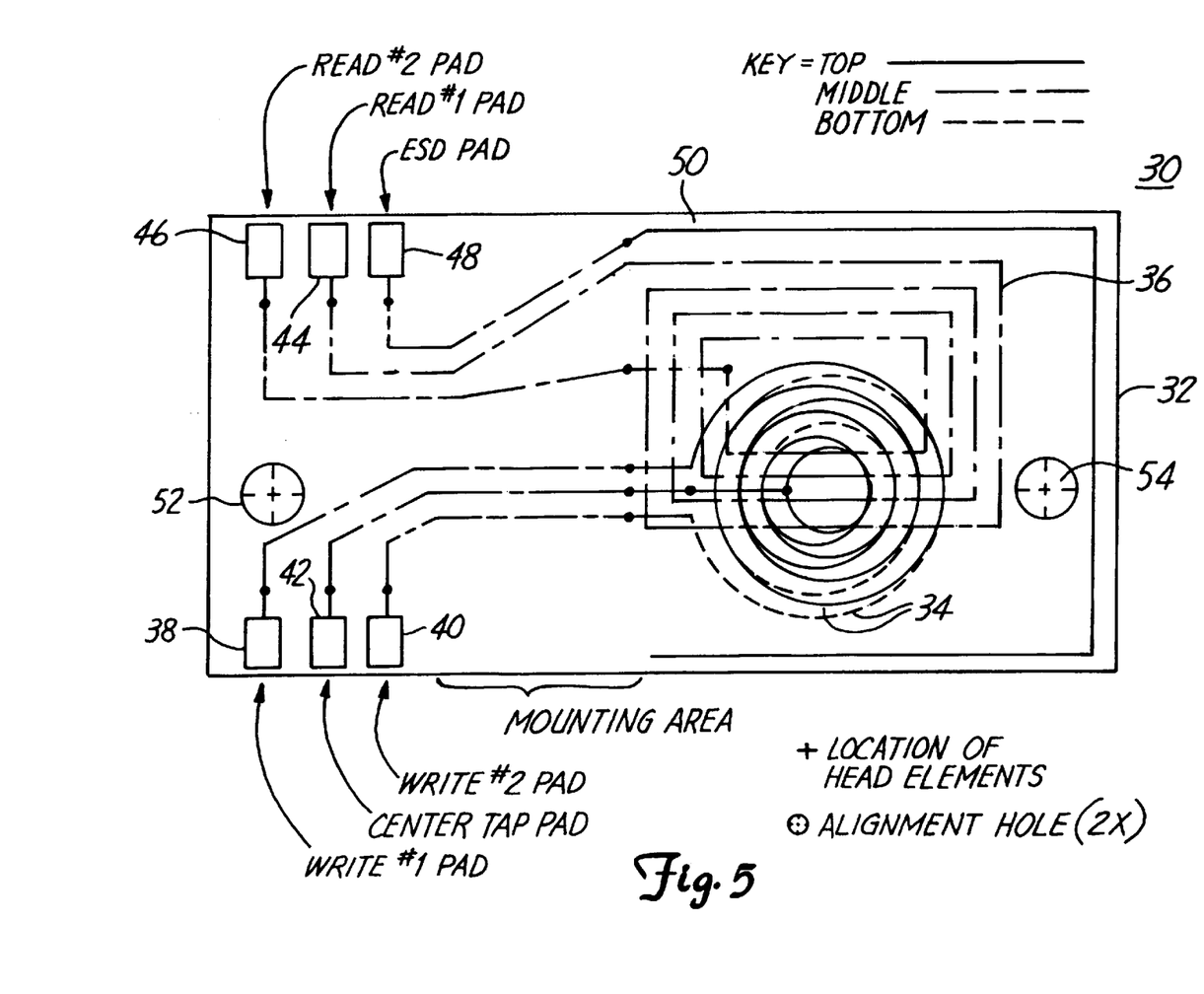
FIG. 5 shows a top, perspective view of the tester of the present invention.

FIG. 5 shows a head tester 30 of the present invention. As shown in FIG. 4, the head tester 30 comprises a substrate 32, a write coil 34, and a read coil 36. A first write pad 38, a second write pad 40, and a center tap pad 42 formed on the substrate 32 are connected to the write coil 34. A first read pad 44 and a second read pad 46 formed on the substrate 32 are connected to the read coil 36. An Electrostatic Discharge ("ESD") pad 48 with an ESD land 50 leading from the pad 48 is formed on the substrate 32. Also, alignment holes 52, 54 have been formed in the substrate 32. The head tester 30 of the present invention is used to test (1) the read/write capability of each head 12 in a HSA 10; and (2) determine whether the heads are positioned properly (or within acceptable ranges) with respect to each other and the coils 34, 36 on the tester 30.

Figure 6:
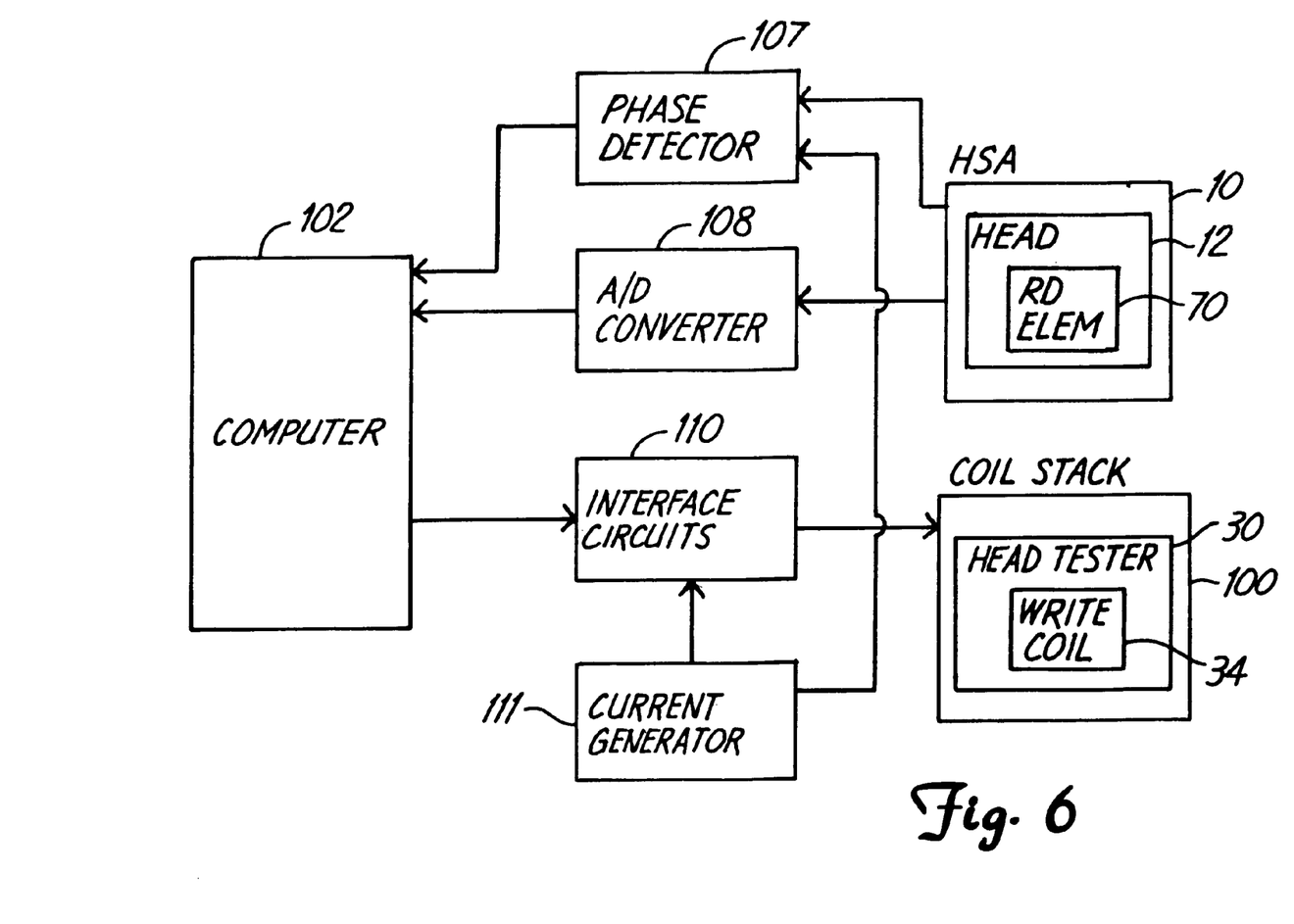
FIG. 6 is a block diagram of the testing apparatus for testing the read element of a head.

Before describing each of these elements of the head tester 30, with reference to FIGS. 6 and 7, a brief description of the testing apparatus to which the head tester 30 is adapted to be connected will be described. The testing apparatus or testing device comprises circuitry and a computer connected to the coil stack 100 (which is a stack of head testers 30) and the HSA 10 to test the heads 12 in the HSA 10. As shown in FIG. 6, to test the read elements 70 of a head 12, each head tester 30 in a coil stack 100 is connected to an interface circuit 110. A current generator 111 and a computer 102 are connected to the interface circuit 110. Each head 12 in the HSA 10 is connected to the computer 102 through an analog-to-digital ("A/D") converter 108. Also, each head 12 in the HSA 10 and the current generator 111 are connected to a phase detector 107. The output of the phase detector 107 is connected to the computer 102. The computer 102 may be any general purpose computer with a processor and memory. In operation, in order to test the read element 70, the computer 102 enables each write coil 34 in the coil stack 100 via the interface circuit 110 and the current generator 111. In response to the current supplied to the write coil 34, a magnetic field is formed normal to the surface plane supporting the write coil 34. In response to this magnetic field, the read element 70 senses a voltage. The computer 102 then receives the voltage sensed by each read element 70 in the HSA 10. Also, based on the output from the read element 70 and the output from the current generator 111, the phase detector 107 enables the computer 102 to determine polarity errors or cross wiring errors of the head 12. In addition, as will be explained in detail later, the computer 102 will also be able to manipulate data received from the heads 12 to determine (1) whether the read/write elements are operational; (2) whether the heads 12 are in proper phase or polarity; and (3) whether the heads 12 are positioned properly on the suspensions 14 of the HSA 10.

Figure 7:
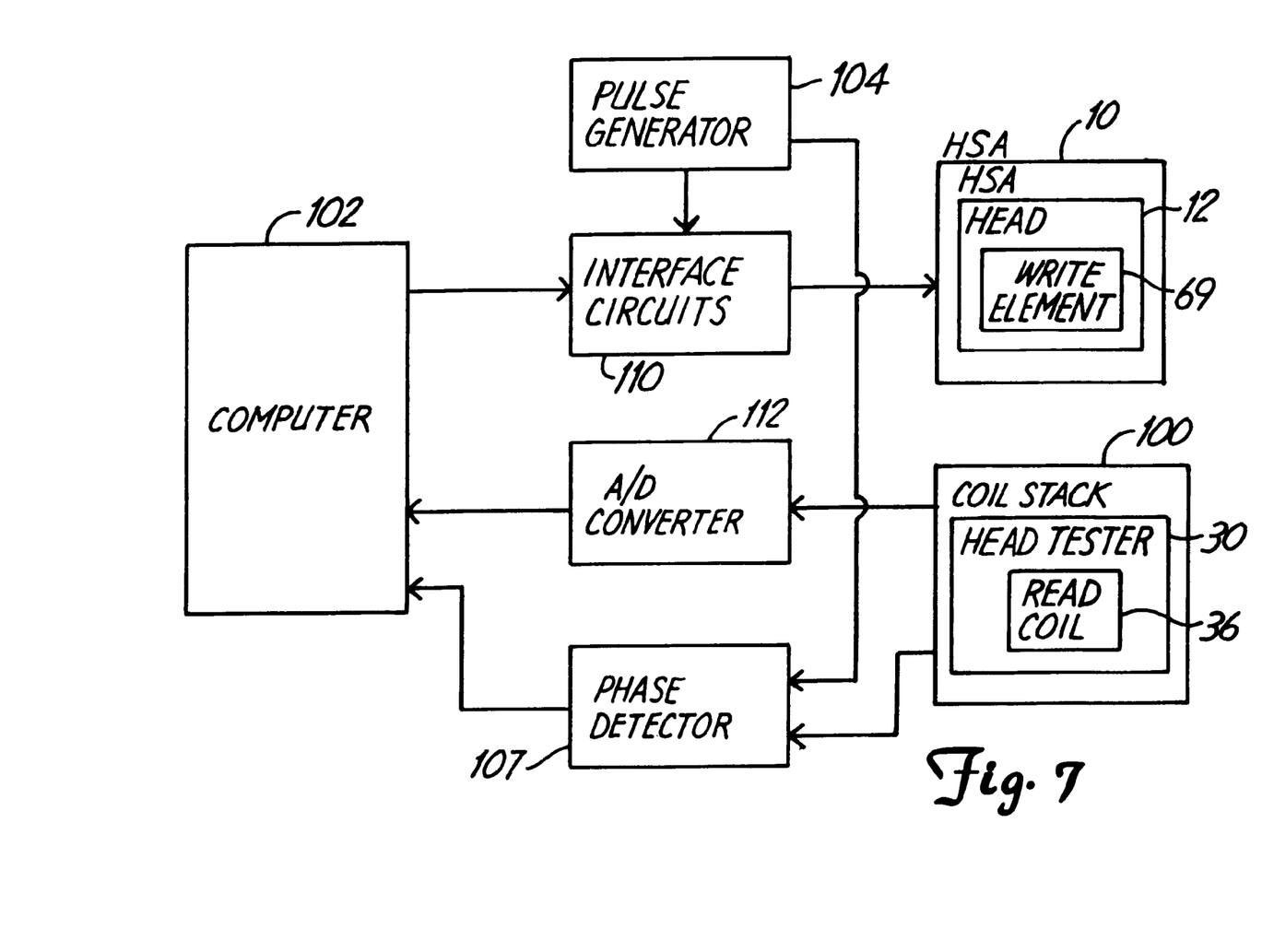
FIG. 7 is a block diagram of the testing apparatus for testing the write element of a head.

As shown in FIG. 7, to test the write element 69 of a head 12, the computer 102 is connected to each head 12 of the HSA 10 through an interface circuit 110. A pulse generator 104 is also connected to the interface circuit 110. Also, each head tester 30 in the coil stack 100 is connected to the computer 102 through an A/D converter 112. A phase detector 107 receives input from each read coil 36 and the pulse generator 104. The phase detector's output is connected to the computer 102. In operation, the computer 102 enables each write element 69 in each head 12 of the HSA 10 to write via the interface circuit 110 and the pulse generator 104. In response to the pulses generated by the pulse generator 104, the write element 69 produces a magnetic flux. In response to the magnetic flux produced by the write element 69, there is a current flowing in read coil 36. A voltage based on this current is received by the computer 102 via the A/D converter 112. Also, based on the output from the read coil 36 and the output from the pulse generator 104, the phase detector 107 enables the computer 102 to determine polarity errors or cross wiring errors of the head 12. The computer 102 performs manipulations that will be described later to determine whether the write element is functional.

Next, each of the elements which form the head tester 30 will be described.

Substrate 32

Figure 10:
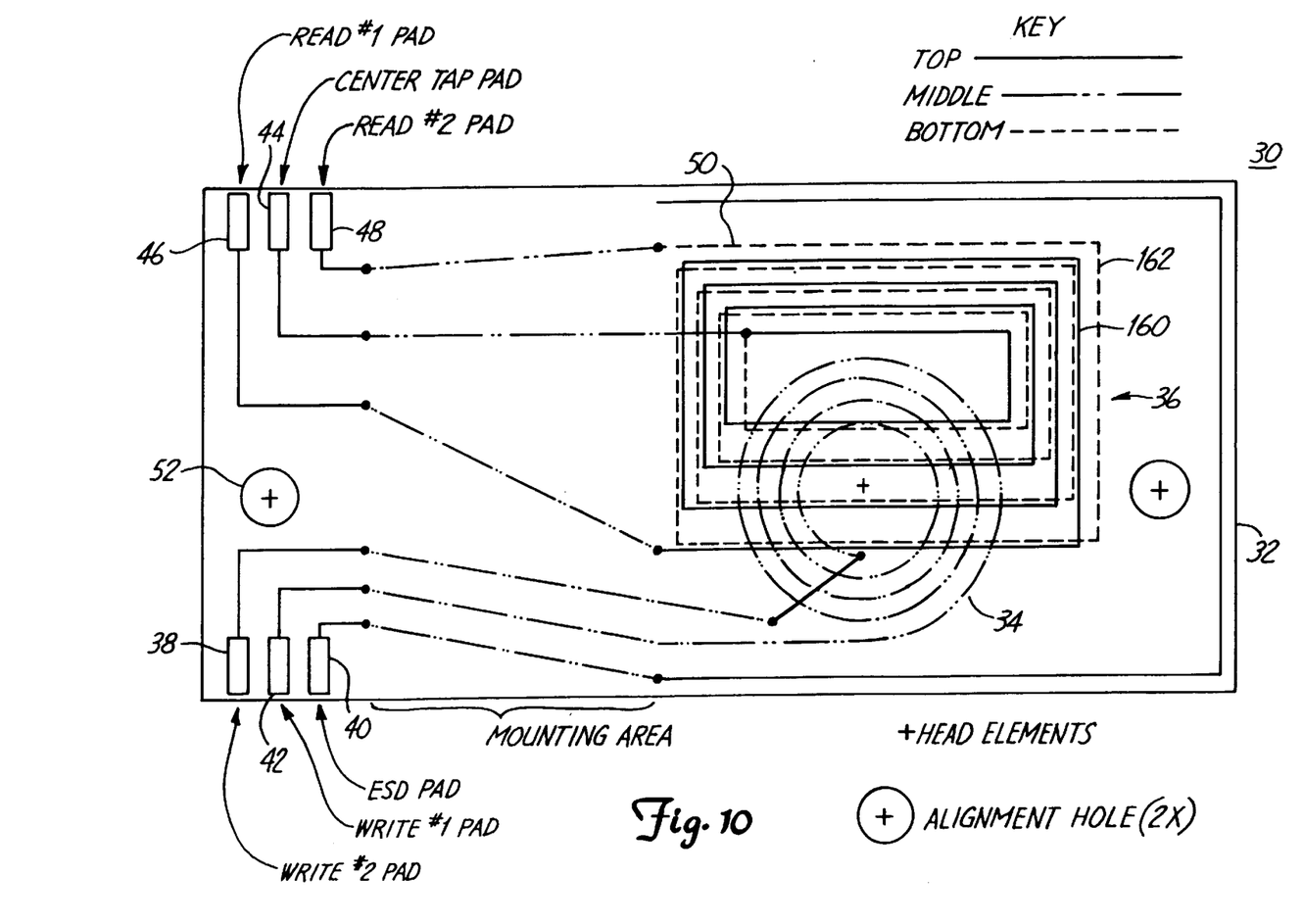
FIG. 10 shows a top, perspective view of an alternative embodiment of the head tester of the present invention.

Referring to FIG. 10, the head tester 30 can be fabricated using a variety of substrates 32. In the preferred embodiment, low cost printed circuit board ("PCB") technology is used to form the substrate 32. A printed circuit board is a planar mechanism consisting of alternating layers of a low-conductivity material and etched copper traces. The printer circuit board may have a plurality of layers including, but not limited to, a top layer, a middle layer, and a bottom layer. Moreover, each layer is on a different surface plane. The traces form the shape of the coils 34, 36 and form the pads 38, 40, 42, 44, 46, 48 for connecting the coil 34, 36 to other electronic components. The shape of the magnetic field is controlled by the precise shape of the etched copper traces. Evaporation, plating and sputtering techniques can also be used in place of etching. A low cost substrate for a PCB is fiberglass or ceramic materials. The PCBs are thin for the narrow gap between heads 12 in a HSA 10, yet small enough in size to be dimensional stable. Moreover, because the PCBs have a plurality of layers, the coils 34, 36 may be formed on separate layers (as shown in FIGS. 5 and 10). Although, in the preferred embodiment a printed circuit board is used to form the substrate 32, and non-conductive material or material having low conductivity may be used as a substrate 32.

Coils 34, 36

As described above, each of the coils 34, 36 is formed with etched copper traces. Each coil 34, 36 is a conductive path on the substrate 32 that either (1) carries electrical current to excite the head's read element or (2) produces a voltage caused by magnetic flux changes from the head's write elements. As shown in FIG. 5, the configuration of the coils 34, 36 is typically a flat spiral that exists on one side, both sides, or in the middle of the substrate. Solder pads, or other means exist, for connecting each coil 34, 36 to drive and sensing circuitry or testing device, which in turn is connected to a computer 102.

As shown in FIG. 5, the shape of the read and write coils 34, 36 may be different. In the preferred embodiment, the write coil 34 has a generally circular spiral shape and the read coil has a generally quadrangular spiral shape. However, the coils 34, 36 may be formed in other shapes.

As will be described in detail later, some embodiments of the head tester 30 use a coil or a half coil. A "half coil" is defined as a coil that is on one surface of the substrate (or PCB) and it can write or read by itself or with the other half coil. Each half coil is in a different surface plane. When multilayer substrates are used the coil can be made up of "third coils", "fourth coils", etc. The "half coil" version of a coil can have four external leads or three external leads depending whether a center tap connection is used.

Figure 8:
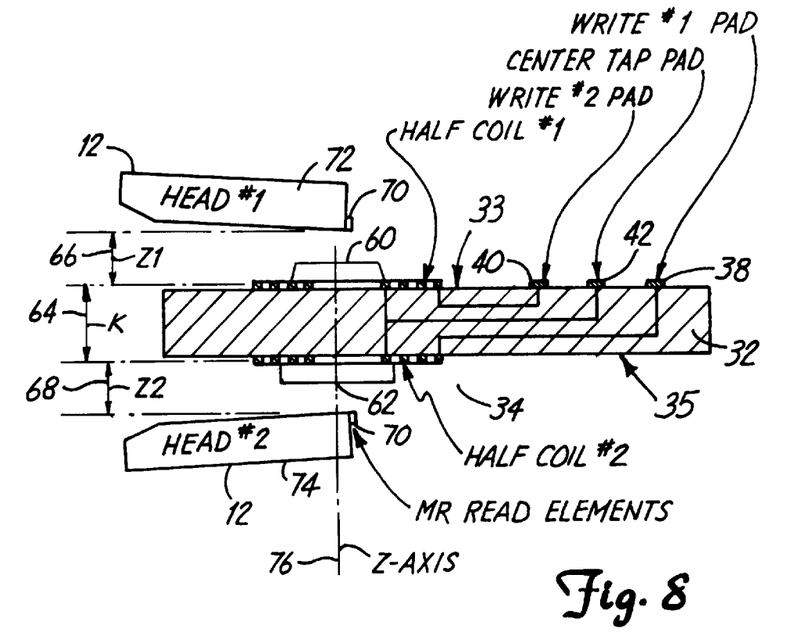
FIG. 8 shows a cross-sectional view of the head tester of the present invention with only the write coils shown and positioned between two heads.

With reference to FIGS. 5 and 8, the write coil 34 and how it is used to test a read element 70 of a head 12 will be described. FIG. 8 is a cross-sectional view of the head tester 30 showing the write coil 34. In this embodiment, the write coil 34 is constructed of a first write half coil 60 and a second write half coil 62. As stated previously, a "half coil" is defined as a coil that is on one surface of the substrate 32 (or PCB) and it can write or read by itself or with the other half coil. Each half coil 60, 62 is in a different surface plane. As shown in FIG. 8, in this embodiment, the first write half coil 60 is formed on the top layer 33 of the substrate 32 and the second write half coil 62 is formed on the bottom layer 35 of the substrate 32. Although, in this embodiment, two half coils are used because two heads 12 need to be tested, any type of coil (i.e., a full coil or coil, a half coil, a third coil, a fourth coil, etc.) may be used depending on the configuration of the heads 12 to be tested. A multilayer substrate 32 may use a coil made up of "third coils", "fourth coils", etc. The "half coil" version of a coil can have four external leads or three external leads depending whether a center tap connection is used.

As more clearly shown in FIG. 5, each of the half coils 60, 62 have a circular spiral shape. In the preferred embodiment, the write coil 34 has a circular spiral shape. However, the write coil 34 may be formed in other shapes.

The first and second write half coils 60, 62 are electrically connected. The half coils 60, 62 are center tap connected. In this disclosure, a center tapped coil ("CTC") or a center tap connection means one half of a coil is physically located on one side (or one layer) of the substrate and the other half of the coil on the other side of the substrate. One end of each half coil is connected to the same pad and this electrical pad 42 is called the center tap pad. The remaining end of each half coil has its own pad 40, 38. A total of three electrical pads exist for a CTC (see FIG. 5 for sketch of the CTC configuration). The center tap pad 42 facilitates connection to other electrical components or testing apparatus.

As shown in FIG. 8, "k" 64 is the distance between the two write half coils 60, 62. Also, "Z1" is the distance from the center of the first write half coil 60 to the MR read element 70 on the first head 72, and "Z2" is the distance from the center of the second write half coil 62 to the MR read element 70 on the second head 74.

In operation, for a half coil 60, 62 to write to a MR read element 70, current flows through a half coil 60, 62. The current causes a magnetic field to form normal to the surface plane supporting the half coils 60, 62 from which the MR read element 70 observes a voltage. If the MR read element 70 does not observe a voltage, then the MR read element 70 is defective.

In addition, as will be described below in detail, by using half coils 60, 62 that are center tap connected and by driving the first write half coil 60 and then the second write half coil 62 or vice versa, the following conclusions regarding the head of the HSA 10 being tested may be drawn: (1) the head 12 is properly, electrically connected for actuation; (2) the spacing between coils and the MR read element 70 of the head 12 being tested is within an acceptable range of distances; and (3) the read and write sensitivity of the head element is within an acceptable range.

Theory

The following discussion presents the theory used (1) to determine the spacing 66, 68 (i.e., Z1 or Z2 in FIG. 8) and (2) to eliminate the spacing dependency in the signals read for purposes of determining the sensitivity of the MR read element 70. The theory also shows that the spacing 66, 68 (i.e., Z1 or Z2 in FIG. 5) can be calculated from the voltage readings made at the MR read element 70. The theory is presented below.

As described previously and as shown in FIG. 8, the write coil 34 may be constructed of two half coils 60, 62 and has a center tapped electrical connection. FIG. 8 shows the location of each half coil 60, 62, their relationship to each of the facing MR read heads 70 for the first head 72 and the second head 74 respectively, and the spacings defined. by the dimensions Z1, k, and Z2.

The description here will be for the case where the half coil 60, 62 writes to the MR read element 70. This description applies equally to the case where the head 12 writes and the coil is reading (this operation will be described later with reference to FIG. 8). Both cases are suitably addressed in one description by the reciprocity principle.

The magnetic field ("H") (in units of Oersteds) along the Z-axis 76 of any single coil (half coil or a full coil) is given by the following expression:

$$H = Ho*0.125/(Z^2+0.25)^{(3/2)} \text{ Oersteds} \quad \text{(Equation \#1)}$$

Z is the distance from the center of the coil to the MR read element 70 that is to be tested. The coil diameter is normalized to 1.0 for the above equation.

Ho is the magnetic field at the center of the coil where Z=0.

Over the range of Z from 0 to 0.75, the magnetic field H can the approximated with an error of less than 10% (full scale) by the following linear equation:

$$H = Ho*(1.070-1.415*Z) \text{ Oersteds} \quad \text{(Equation \#2)}$$

The term Ho is a constant for a given value of coil diameter and coil current.

The expression for Ho when the coil diameter is 1.0 mm is given below:

$$Ho = 4*Pi*I \text{ Oersteds} \quad \text{(Equation \#3)}$$

I is the current in the coil in amperes and Pi=3.1416.

For a current of 1.0 ampere, the term Ho is equal to 4*Pi Oersteds.

Now, the MR read element's 70 sensitivity is defined as S and the units for sensitivity are Volts/Oersted. The magnetic field used in the definition of S is the magnetic field that exists at the MR read element 70. The voltage ("V") observed from an MR read element 70 placed along the Z-axis 76 of the coil is $$V = S*H = S*Ho*(1.070-1.415*Z) \text{ Volts} \quad \text{(Equation \#4)}$$

The sensitivity S is a property of the MR read element 70 and its associated amplifier gain. S is not a function of Z.

For example, this theory will be applied as follows, in the case shown in FIG. 8 where there are two half coils 60, 62 and, for purposes of this example, the first head 72 is the one being tested (i.e., the first head 72 will be reading via its MR read element 70). When first write half coil 60 writes (i.e, a current is driven through the first write half coil 60, which causes a magnetic field along the Z-axis (normal to the surface plane supporting the first write half coil) from the center of the first write half coil 60), the voltage ("V1") observed from the first head 72 is:

$$V1 = S1*Ho*(1.070-1.415*Z1) \text{ Volts.} \quad \text{(Equation \#5)}$$

S1, in Equation #5, is the sensitivity of the first head 72 when the first write half coil 60 writes. When the second write half coil 62 writes (i.e, a current is driven through the second write half coil 62, which causes a magnetic field along the Z-axis (normal to the surface plane supporting the second write half coil) from the center of the second write half coil 62), the voltage ("V2") observed from the first head 70 is:

$$V2 = S1*Ho*(1.070-1.415*(Z1+k)) \text{ Volts} \quad \text{(Equation \#6)}$$

As in Equation #5, in Equation #6, S1 is the sensitivity of the first head 70 when the second write half coil 62 writes. The two unknowns in Equations #5 and 6 are S1 and Z1. The solution for S1 and Z1 are given below:

$$S1 = (V1-V2)/(1.415*k*Ho) \quad \text{(Equation \#7)}$$

$$Z1 = (1.070/1.415) - k*V1/(V1-V2) \quad \text{(Equation \#8)}$$

As stated previously with respect to Equation 3, when I=1.0 amps, the value of Ho is 4*Pi=12.57 Oersteds, and for a k of 0.3 mm, the equations for S1 and Z1 become:

$$S1 = 0.188*(V1-V2) \text{ volts/oersted} \quad \text{(Equation \#9)}$$

$$Z1 = 0.756 - 0.3*V1/(V1-V2) \text{ mm} \quad \text{(Equation \#10)}$$

This example illustrates that with a write operation from each half coil 60, 62 and the corresponding voltages read by the first head 72, two important parameters can be determined: (1) the parameter, S1, which is the sensitivity of the MR read element 70 in the first head 72; and (2) the parameter Z1, which is the spatial separation or distance from the center of the first write half coil 60 to the MR read element 70 in the first head 72, which is the corresponding read element to the first write half coil 60. The value of S1 is independent of the half coil 60 to head separation (i.e., Z1) and the value S1 represents the same voltage that would be measured if it were possible to place the MR read element 70 at the center of one of the half coils 60, 62 while it is writing. Similarly, the value of Z1 is independent of the sensitivity (i.e., S1) of the MR read element 70 of the first head 72.

Thus, the center tapped coil configuration with a half coil 60 on one side of the substrate 32 and the other half coil 62 on the other side of the substrate 32 allows both half coils 60, 62 to be used as one full coil or as one half coil at a time. Also, knowing the separation (k) between the two half coils 60, 62 (i.e., if one half coil is on the top layer of the substrate and one half coil is on the bottom layer of the substrate 32, then the separation is equal to the thickness of the substrate) and being able to use one half coil 60, 62 at a time allows information about the spatial separation (i.e., the value of Z1 in the above example) between the half coil and the head 12 being tested by the head tester 30 to be determined. Knowing the separation between the half coil and the head 12 being tested (i.e., the calculated Z1 value), allows comparison of it to the expected range of distance between a head 12 and a corresponding MR read element 70 for undamaged heads. The ability of the tester 30 to account for spatial separation overcomes the following problems: (1) being able to precisely define the sensitivity of the MR read element 70 independent of the separation between the MR read element 70 and the coil; and (2) determine whether the spacing between the head 12 and the half coil 60, 62 is within and acceptable range of distances. By determining the precise sensitivity of the read element 70, by comparing the sensitivity to accepted ranges of sensitivity of read elements, a determination may be made as to whether the read element has an acceptable sensitivity level.

Moreover, by driving a first half coil and then the second half coil, the head selected and its polarity can be determined. The half coil closer to the head will always have a higher response (i.e., detect a higher voltage value) than the further half coil that is identical in shape and current. This feature thus enables the tester 30 to be used to determine whether the head selection circuitry (i.e., the circuitry that enables actuation of the proper head) is properly assembled. That is, to determine whether the two head selection lines or wires were reversed and at the same time the polarity of the head element is reversed or to assure proper wiring of the heads to the hard file electronics, including but not limited to, the following signal lines: head select, read/write select, MR polarity, write polarity, fault lines, read unsafe, write unsafe, data read, and data write.

Also, described previously with reference to FIG. 4, a separator 130 is used during testing of a HSA 10. The separator 130 will hold the suspension 14 near the end where the head 12 is attached and the head tester 30 is positioned accurately with respect to the separator 130. This allows the measurement of distance between a coil 34, 36 on the head tester 30 and the read element 70, which in turn enables direct measurement of a combination of head tilt on the suspension 14 and dimple separation between the head and suspension. Knowing Z1 prior to head merging with the disk can identify a potential problem during merge or the potential of head flying problems after merge.

Determination of Positional Information

Physical dimensions other than the head spacing can be determined with the stack of testers 30 inserted between a stack of heads 12. Below is a discussion on how positional information in the plane of the hard disk can be determined using precisely aligned coils. The X-Y plane (plane of the hard disk) is normal to the Z axis.

With the coil stack 100 having the capability to move in either the X or the Y direction or both, the alignment of the heads 12 in their head stack assembly 10 can be determined in one or both of these directions. The capability to make accurate head alignment measurements depends on the accuracy to which the coils on the tester 30 have been aligned. The tester 30 use two alignment holes 52, 54 (see FIG. 5) to position each tester 30 during assembly of the coil stack. This alignment hole 52, 54 is fabricated in the substrate along with the coils themselves. During coil stack assembly, an alignment pin is used to position the testers 30 one above the other in the X-Y plane.

In order to precisely align the centers of each coil 34, 36 on a tester 30, alignment holes 52, 54 are accurately placed in the PCB at a location relative to the center of the tester 30. Alignment holes 52, 54 are located relative to the copper traces etched on each surface, and are defined by etched copper traces as well. A laser will be used to drill the alignment hole accurately within the constraints of the copper traces. The centers of the etched copper trace coils and the centers of the drilled holes can be held to a tolerance of 0.01 mm or less. This alignment of the centers of the etched copper trace coils and the centers of the drilled alignment holes 52, 54 is obtained using conventional PCB fabrication techniques. The alignment holes 52, 54 are used during the assembly of an array of testers (i.e., a coil stack 100) to align the coil centers one above the other. Alignment is obtained by inserting one close fitting pin through each hole 52, 54 while the pin is held by external gauge blocks. The testers 30 are fastened in place and then the close fitting pins are removed.

With the centers of the coils 34, 36 in the head testers 30 aligned in the X and Y direction, the location of the MR read element 70 can be measured by writing with a coil during movement in either the X or the Y direction. The MR read element 70 voltage increases then decreases as the MR element moves past the center of the coil that is writing. A magnetic center point (i.e., peak voltage) is determined by performing the write operation in incremental steps in either the X or the Y direction. Based on the determined magnetic center point, the two locations where the voltage is 50% of the peak voltage will be determined. By noting the location of the two 50% of peak voltage points and calculating the average of these two locations, the location of the MR element is known in the direction of movement. Based on the determined location of the MR elements, any manufacturing corrections necessary to align all the heads can be implemented. Both X alignment and Y alignment of the heads 12 are important dimensions that require quantification for each head stack. While this procedure described from X and Y axis alignment of the heads was described using write operation, a read operation may be performed incrementally in either the X or Y direction to determine the magnetic center point.

Testing Heads Ability to Write

Figure 9:
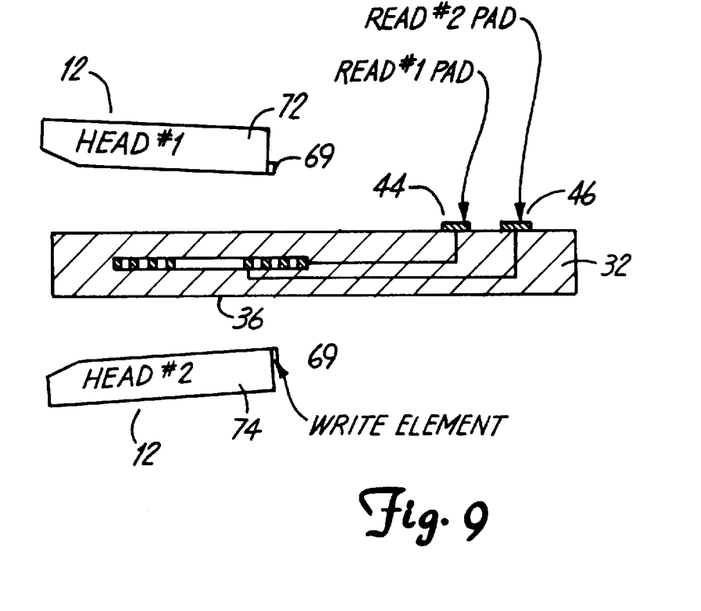
FIG. 9 shows a cross-sectional view of the head tester of the present invention with only the read coil shown and positioned between two heads.

With reference to FIGS. 5 and 9, the mode where the head 12 writes to a read coil 36 that produces a read voltage is now described. FIG. 9 shows a cross sectional view of the head tester 30 with the read coil 36 and the first and second read pads 44, 46. The first head 72 and the second 74 each has a write element 69. As shown in FIGS. 5 and 9, the read coil 36 is located in one of the inner layers of a multi-layer PCB substrate 32. The read coil 36 cannot be located on a layer that supports the write coil 34. The coil 36 is used only for reading and is positioned so the head write elements 69 are above (or below) the windings of the coil 36. As shown in FIG. 5, the read coil 36 has a generally quadrangular spiral shape. Although the read coil 36 is depicted as having a quadrangular spiral shape, the read coil 36 may be formed in other shapes.

Thus, because the coils 34, 36 are electrically separated from one another by using multi-layer PCB technology, one coil 34 is used for writing to the head and a separate coil 36 is used for reading the head's write field. Also, as shown in FIG. 5, the write coil 34 is positioned such that the read element 70 of the head is sensitive to the write coil 34. Similarly, the read coil 36 is positioned to be sensitive to the write element 69 of the head 12. Thus, neither the read/write elements of the heads 12 nor the coils on the tester 30 need to be moved to test both the read element 70 and the write element 69. In fact, the coils are electrically selected by the computer 102 to permit rapid changes between write and read modes.

As stated above, in order for the coil 36 to read while a head 12 writes via the write element 69, the coils 34, 36 are not moved physically, but electrically switched to operate the read coil 36. In operation, the write element 69 is enabled to write, and outputs a magnetic flux. A current flows through the read coil 36 in response to this magnetic flux from the write element 69. While the coil 36 is reading, the value of Z (i.e., the distance from the read coil 36 corresponding to the head being tested 72 which is Z1+(1/2*k)) is known from the write operation (described with respect to FIG. 5 where the coil 34 wrote and the head 12 read). Also, the thickness of the substrate is known. For the distance Z to be Z1+(1/2*k), it is assumed that the read coil is in the middle layer of the substrate. Based on the theory described earlier, the sensitivity can be calculated if the separation is known. The signal read by the coil 36 can then be corrected for the known spacing loss to give the field strength at the write pole tips of the head's TFW elements 69. The signal read by the coil 36 corresponds to the amount of magnetic flux produced through the write element 69. A low signal means that a small amount of flux has been produced by the head, which could indicate one of the following problems: (1) the circuitry in the head is slowing down the amount of flux produced; (2) the magnetic material is not as permeable; and/or (3) the pole tip is too thin. Thus, the signal enables a determination of the sensitivity of the write element 69. The sensitivity of the write element 69 is based on the amount of magnetic flux that is coming out of the pole tip and the rate at which the amount of magnetic flux coming out of the pole tip is changing. This information based on the signal can indicate pole tip saturation or other properties of the elements that lead to poor performance in the hard file. Also, this information based on the signal can indicate saturation flux of the write head pole tips with correction made for spacing loss between the head elements and the coil.

Alternative Embodiments

With reference to FIG. 10, an alternative embodiment of the head tester 30 will be described. As shown in FIG. 10, the head tester 30 comprises a substrate 32, a write coil 34, and a read coil 36. In this embodiment, the read coil 36 is formed with two half coils 160, 162 and the write coil 34 may be formed as one coil. As shown in FIG. 10, a first read half coil 160 is formed on the top layer of substrate 32, a second read half coil 162 is formed on the bottom layer of substrate 32, and the write coil 34 is formed in a middle layer of the substrate 32. Also, the two half coils 160, 162 would be center tap connected. The read coil 36 would be sensitive to the write element 69 of the head and the write coil 34 would be positioned such that the read element 70 of the head 12 would be sensitive to the write coil 34.

In this embodiment, the read operations would be used (1) to determine spatial separation (i.e., Z1) between the center of the read half coil and the write element of the corresponding head 12 (i.e., the head 12 facing the read half coil), and (2) to determine the sensitivity of the write element. Then, based on the read operations, when the write coil 34 is used, the spatial separation information determined from the read operations may be used to determine sensitivity of the read elements 70 of the head 12. The theory previously described with respect to the write operations is equally applicable to this embodiment.

Also, another alternative would be to form both the read and write coil 34, 36 with one coil each. Each coil would be on a different surface plane of the substrate 32. In this embodiment, the read coil 36 would be positioned such that it is sensitive to the write element of the head 12, and the write coil 34 would be positioned on the substrate 32 such that the read element 70 would be sensitive to the write coil 34.

Manufacturing Process

A coil stack having a plurality of head testers 30 which can be manufactured quickly, with high quality and low cost. The head tester 30 comprises a substrate 32 supporting the read coil 34 and the write coil 36 with their corresponding pads 38, 40, 42, 44, 46. The multilayer printed circuit board substrate 32 permits the coils 34, 36 to placed on a common axis between the top head 72 and the bottom head 74. The paths from each coil 34, 36 are brought out to connection pads 38, 40, 42, 44, 46. The paths are routed to not short the read structure to the write structure.

An ESD ground land 50 is provided on the top and bottom perimeter of the substrate 32 where the head 72, 74 passes in proximity during insertion of the head into the coil stack. ESD is an acronym for Electrical Static Discharge. An ESD event can damage the MR read or write elements 70, 69 of a head 12 or the electronics that are associated with the HSA 10. Special handling is required to avoid these events. This ground land 50 provides built in protection against an ESD event when the ESD pad 48 is shorted to ground through a resistor of less than one megohm. The width of this line will be maximized to the extent it does not induce excessive capacitive coupling with the coils. In the preferred embodiment, the width of the ESD line 50 is 0.1 millimeters. This ESD ground land maintains a ground potential around the coils to prevent an ESD event.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A head tester for testing magnetic heads having a read element and a write element, comprising:
   (a) a substrate;
   (b) a read coil carried by the substrate, the read coil adapted to communicate with the write element; and
   (c) a write coil carried by the substrate and axially offset from the read coil, the write coil adapted to communicate with the read element.

2. The tester of claim 1, wherein the substrate has multiple layers, and wherein the read coil and write coil are carried by different layers.

3. The tester of claim 1, wherein the read coil is formed using copper.

4. The tester of claim 1, wherein the read coil is a flat coil supported by the substrate.

5. The tester of claim 4, wherein the read coil is a generally quadrangular spiral shaped coil.

6. The tester of claim 2, wherein the read coil is a flat coil formed on one of the top and bottom surfaces of the substrate.

7. The tester of claim 1, wherein the write coil is a flat coil supported by the substrate.

8. The tester of claim 7, wherein the write coil has a generally circular spiral shape.

9. The tester of claim 6, wherein the write coil is formed on the other one the top and bottom surfaces of the substrate.

10. The tester of claim 1, wherein the write coil comprises:
   (a) a first write half coil supported by the substrate; and
   (b) a second write half coil supported by the substrate.

11. The tester of claim 10, wherein the first and second write half coils are formed on the substrate such that the coils are not on the same surface plane.

12. The tester of claim 11, wherein the first and second write half coils have a generally circular spiral shape.

13. The tester of claim 11, wherein the first and second write coils are center tap connected.

14. The tester of claim 13, wherein the read coil is formed one a surface plane of a layer not supporting the write coil.

15. The tester of claim 14, further comprising:
   (a) a first write pad, a second write pad, and a center tap pad connected to the write coil, wherein the first write pad, the second write pad and the center tap pad are adapted for connecting the tester to a testing apparatus for enabling testing of a head; and
   (b) a first read pad and a second read pad connected to the read coil, wherein the first read pad and the second read pad are adapted for connecting the tester to a testing apparatus for enabling testing of a head.

16. The tester of claim 1, wherein an electrostatic discharge land is formed on the substrate.

17. The tester of claim 16, further comprising a electrostatic discharge pad, whereby, the electrostatic discharge land and pad are for maintaining a ground potential around the coils to prevent an electrostatic discharge event.

18. A tester for testing a magnetic head, comprising:
   (a) a substrate having a first layer and a second layer and a third layer;
   (b) a first write half coil carried by the first layer, the first write half coil adapted to communicate with the magnetic head;
   (c) a second write half coil carried by the second layer, the second write half coil adapted to communicate with the magnetic head, wherein the first and second write half coils are center tap connected and generally coaxially aligned; and
   (d) a read coil carried by the third layer wherein the read coil is axially offset from the first write half coil and the second write half coil, the read coil adapted to communicate with the magnetic head.

19. The tester of claim 18, wherein the first and second write half coil are generally circular spiral shape.

20. The tester of claim 18, wherein the read coil has a generally rectangular shape.

21. The tester of claim 18, further comprising:
   (a) a first write pad, a second write pad, and a center tap pad connected to the write coil, wherein the first write pad, the second write pad and the center tap pad are adapted for connecting the tester to a testing apparatus for enabling testing of a head; and
   (b) a first read pad and a second read pad connected to the read coil, wherein the first read pad and the second read pad are adapted for connecting the tester to a testing apparatus for enabling testing of a head.

22. The tester of claim 18, wherein an electrostatic discharge land is formed on the substrate.

23. The tester of claim 22, further comprising a electrostatic discharge pad, whereby, the electrostatic discharge land and pad are for maintaining a ground potential around the coils to prevent an electrostatic discharge event.

24. A tester for testing a magnetic head, comprising:
   (a) a substrate having a first layer and a second layer and a third layer;
   (b) a first read half coil carried by the first layer, the first read half coil adapted to communicate with the magnetic head;
   (c) a second read half coil carried by the second layer, the second read half coil adapted to communicate with the magnetic head wherein the first and second read half coils are center tap connected and generally coaxially aligned; and
   (d) a write coil carried by the third layer wherein the write coil is axially offset from the first read half coil and the second read half coil, the write coil adapted to communicate with the magnetic head.

25. The tester of claim 24, wherein the first and second read half coils have a generally quadrangular spiral shape.

26. The tester of claim 24, wherein the write coil has a generally circular spiral shape.

27. The tester of claim 24, further comprising:
   (a) a first read pad, a second read pad, and a center tap pad connected to the read coil, wherein the first read pad, the second read pad and the center tap pad are adapted for connecting the tester to a testing apparatus for enabling testing of a head; and
   (b) a first write pad and a second write pad connected to the write coil, wherein the first write pad and the second write pad are adapted for connecting the tester to a testing apparatus for enabling testing of a head.

28. The tester of claim 24, wherein an electrostatic discharge land is formed on the substrate.

29. The tester of claim 28, further comprising a electrostatic discharge pad, whereby, the electrostatic discharge land and pad are for maintaining a ground potential around the coils to prevent an electrostatic discharge event.

30. A method for determining a spatial separation between a half coil on a tester and a corresponding read element being tested, the method comprising the steps of:
   providing a tester with a first and second layer and a first and second half coil, each located on separate layers;
   driving the first half coil such that a magnetic field is formed normal to the surface plane that is supporting the first half coil;
   determining a first voltage at the read element being tested;
   driving the second half coil such that a magnetic field is formed normal to the surface plane that is supporting the second half coil;
   determining a second voltage at the read element being tested; and
   determining the spatial separation between the half coil on the tester and the corresponding read element being tested based on the first voltage and the second voltage.

31. The method of claim 30, further comprising the step of manipulating the first and second voltages to determine the spatial separation between the half coil and the corresponding read element being tested.

32. A method for determining a spatial separation between a half coil on a tester and a corresponding write element being tested, the method comprising the steps of:
   providing a tester with a first and second layer and a first and second half coil, each located on separate layers;
   driving the first half coil such that a magnetic field is formed normal to the surface plane that is supporting the first half coil;

determining a first voltage at the write element being tested;

driving the second half coil such that a magnetic field is formed normal to the surface plane that is supporting the second half coil;

determining a second voltage at the write element being tested; and determining the spatial separation between the half coil on the tester and the corresponding write element being tested based on the first voltage and the second voltage.

33. The method of claim 32, further comprising the step of manipulating the first and second voltages to determine the spatial separation between the half coil and the corresponding write element being tested.

34. A method for determining a sensitivity of a read element being tested, the method comprising the steps of:

providing a tester with a first and second layer and a first and second half coil, each located on separate layers;

driving the first half coil such that a magnetic field is formed normal to the surface plane that is supporting the first half coil;

determining a first voltage at the read element being tested;

driving the second half coil such that a magnetic field is formed normal to the surface plane that is supporting the second half coil;

determining a second voltage at the read element being tested; and determining the sensitivity of the read element being tested based on the first voltage and the second voltage.

35. The method of claim 34, further comprising the step of manipulating the first and second voltages to determine the sensitivity of the read element being tested independent of the separation between the half coils and the read element being tested.

36. A method for determining a sensitivity of a write element being tested, the method comprising the steps of:

providing a tester with a first and second layer and a first and second half coil, each located on separate layers;

driving the first half coil such that a magnetic field is formed normal to the surface plane that is supporting the first half coil;

determining a first voltage at the write element being tested;

driving the second half coil such that a magnetic field is formed normal to the surface plane that is supporting the second half coil;

determining a second voltage at the write element being tested; and determining the sensitivity of the write element being tested based on the first voltage and the second voltage.

37. The method of claim 36, further comprising the step of manipulating the first and second voltages to determine the spatial separation between the half coil and the corresponding write element being tested.

38. A method for testing a head having a read element and a write element using a head tester having a first write half coil, a second write half coil, and a read coil, wherein the first and second write half coils are center tap connected, the method comprising the steps of:

driving a first write half coil such that a magnetic field is formed normal to the surface plane that is supporting the first write half coil;

determining a first voltage at the read element;

driving a second write half coil such that a magnetic field is formed normal to the surface plane that is supporting the second write half coil;

determining a second voltage at the read element;

based on the first and second voltages, determining a sensitivity of the read element; and based on the first and second voltages, determining a spatial separation between the read element and the first write half coil.

39. The method of claim 38, further comprising the steps of:

determining a voltage at the read coil based on current flowing in the read coil in response to a magnetic flux from the write element being tested;

determining a spatial separation of the read coil from the write element based on the spatial separation between the read element and the first write half coil and a distance between the first write half coil and the read coil; and determining the sensitivity of the write element based on the voltage at the read coil and the spatial separation of the read coil from the write element.

40. A method for testing a head having a read element and a write element using a head tester having a first read half coil, a second read half coil, and a write coil, wherein the first and second read half coils are center tap connected, the method comprising the steps of:

(a) driving the write element to be tested such that magnetic flux is flowing from the write element;

(b) determining a first voltage at the first read half coil based on the current flowing in the coil in response to the magnetic flux from the write element being tested;

(c) driving the write element to be tested such that magnetic flux is flowing from the write element; and (d) determining a second voltage at the second read half coil based on the current flowing in the coil in response to the magnetic flux from the write element being tested;

(e) based on the first and second voltages, determining a sensitivity of the write element; and (f) based on the first and second voltages, determining a spatial separation between write element and a corresponding read half coil.

41. The method of claim 40, further comprising the steps of:

(a) driving a write coil such that a magnetic field is formed normal to the surface plane that is supporting the write coil;

(b) determining a first voltage at the read element;

(c) determining the spatial separation of the write coil from the read element being tested based on the determined spatial separation of the write element and the corresponding read half coil and a distance between the corresponding read half coil and the write coil; and (d) based on steps (b) and (c), determining the sensitivity of the read element.

42. A coil stack, comprising:

a plurality of head testers for testing a plurality of magnetic heads, wherein each tester comprises:

(a) a substrate having a first and second layer;

(b) a read coil carried by the first layer, the read coil adapted to communicate with one of the plurality of magnetic heads; and (c) a write coil carried by the second layer and axially offset from the read coil, the write coil adapted to communicate with one of the plurality of magnetic heads.

43. The coil stack of claim 42, and further comprising an alignment hole correspondingly positioned on each tester, the alignment hole adapted to align the plurality of head testers.

44. A method for aligning heads in a head stack assembly, comprising:
   (a) positioning an aligned coil stack for testing heads in a head stack assembly, wherein the aligned coil stack has a plurality of head testers having a plurality of write coils and a plurality of read coils, wherein each write coil on each head tester is generally coaxially aligned with each other;
   (b) writing with each write coil on the coil stack;
   (c) moving the coil stack along a plane parallel to a surface plane of each write coil;
   (d) monitoring the voltage observed at each read element in the head stack assembly;
   (e) based on the observed voltage values, determining the location of the read element.

45. The method of claim 44, wherein the step of monitoring the voltage comprises the step of determining a peak voltage.

46. The method of claim 45, wherein the step of monitoring further comprises the step of determining 50% of the peak voltage.

47. The method of claim 46, wherein the step of determining the location of the read element comprises the steps of:
   (a) determining the two locations of the 50% peak voltage readings; and
   (b) averaging the two locations to determine the location of the head.

* * * * *